United States Patent [19]

Santarelli

[11] 4,377,307

[45] Mar. 22, 1983

[54] SELF SECURING TONNEAU COVER

[76] Inventor: Francis L. Santarelli, 58 St. James. Ct., Daly City, Calif. 94015

[21] Appl. No.: 207,457

[22] Filed: Nov. 17, 1980

[51] Int. Cl.³ .............................................. B60J 7/20
[52] U.S. Cl. .................................. 296/136; 296/95 R
[58] Field of Search .................... 296/136, 210, 95 R, 296/78 R, 83; 24/265 R, 265 EC

[56] References Cited
U.S. PATENT DOCUMENTS 3,172,695 3/1965 Bordinat ............................ 296/136
3,223,446 12/1965 Coppock ............................ 296/136
4,013,315 3/1977 West ................................... 296/83

OTHER PUBLICATIONS

J. C. Whitney & Co., copyright 1978, p. 101.

Primary Examiner—Joseph F. Peters, Jr.
Assistant Examiner—John A. Carroll

[57] ABSTRACT

A vehicle tonneau cover including new features and improvements to allow the tonneau cover to position, attach, and secure itself to a vehicle through the use of tabs extending down from the tonneau cover, thereby allowing the vehicle to remain as originally manufactured.

7 Claims, 12 Drawing Figures

U.S. Patent  Mar. 22, 1983  Sheet 2 of 2  4,377,307
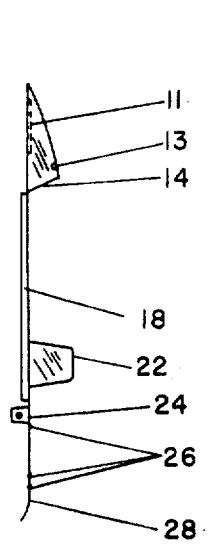
FIG. 6
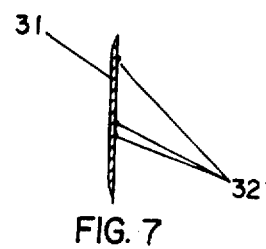
FIG. 7
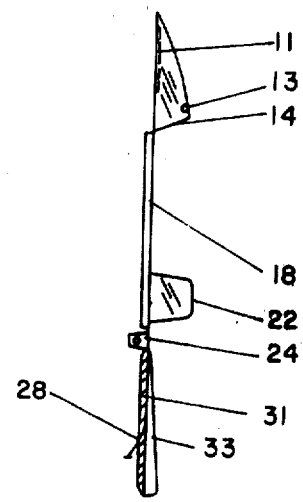
FIG. 8
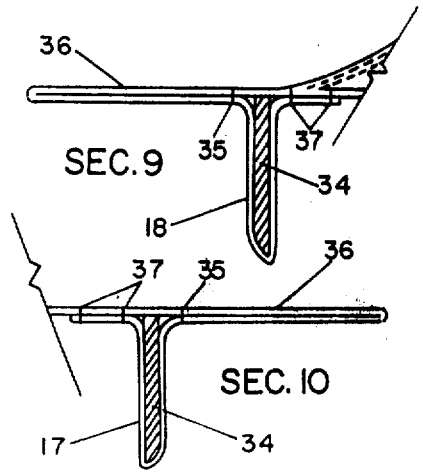
SEC. 9
SEC. 10
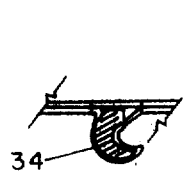
FIG. 11
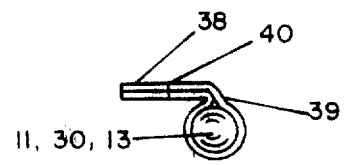
FIG. 12

SELF SECURING TONNEAU COVER

This invention relates to covers that extend over and protect and/or decorate the driver and/or passenger areas that may be exposed in open, partly open, convertible, partly convertible, and partly closed vehicles or combinations thereof, generally known in the trade as 'tonneau' covers. This invention concerns an improvement that enhances the utility of and relates to tonneau covers such as those in the prior art that are manufactured presently, have been manufactured in the past, or that may be manufactured in the future, either as mass-produced or individual ready-made, or individual custom-made, that may be made from a variety of materials, in a variety of colors, or combinations thereof; by any of a variety of methods, processes, or combinations thereof; in a variety of shapes and sizes to generally suit them to the various vehicles they may be made for; decorated or ornamented as desired in any of a wide variety of materials, shapes and sizes, motifs, or combinations thereof, in black and white and/or in color.

The invention includes new features and improvements to allow the tonneau cover to position itself and/or secure itself and/or attach itself to a vehicle through the use of attaching fasteners and/or fixtures attached to the tonneau cover alone, thereby allowing the vehicle to remain as originally manufactured.

While the general structure, construction, and utilitarian features of tonneau covers in the prior art or that may be in the future art may be herein discussed, it will generally be for the purpose of illustrating how the instant improvement may be adapted to typical examples, it being understood that there are many such types, shapes, sizes, combinations thereof, and adaptations which may include but are not limited to those herein discussed and/or illustrated, and to which the instant invention pertains.

Accordingly, it is an object of the instant invention to provide a ready-made (as differentiated from 'custom' or 'especially and specifically made') tonneau cover that includes all attachment and securing fixtures necessary for immediate installation on a vehicle and thereby allowing the vehicle to remain as originally manufactured.

It is also an object of the instant invention to provide tonneau covers for the various vehicles for which tonneau covers are available, and also those suitable vehicles for which no covers have heretofore been available because of difficulty of manufacture or excessive cost or price or any other reason; such covers being not only decorative to the vehicle, but also protective of the interior of the vehicle from the effects of weather, the elements, and to some extent curiosity, and thereby helping to prolong the life of the parts so protected.

It is a further object of the instant invention to provide a tonneau cover that is readily identifiable and differentiated from the ordinary state-of-the art tonneau cover, both in design features and design improvements.

BRIEF DESCRIPTION OF THE DRAWINGS

FIG. 6 is a side elevational view of the tonneau cover of FIG. 1.

FIG. 7 is a side elevational view of the separate boot cover of FIG. 2.

FIG. 8 is a side elevational view of the tonneau cover of FIG. 3.

Sections 9 and 10 are views of a cross-section of the window well tabs.

FIG. 11 is a view in cross-section of a variation of the filler.

FIG. 12 is a view in cross-section of a tonneau cover stiffener.

IN THE ACCOMPANYING DRAWING

Figure 1:
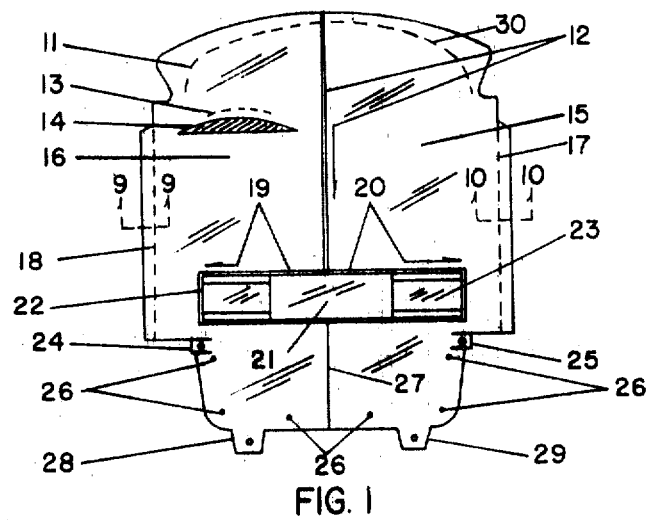
FIG. 1 is a plan view of the tonneau cover of this invention.

FIG. 1 is a plan view of a tonneau cover showing the basic elements of basic convertible or open-vehicle tonneau covers, including driver's side cover 16 with headrest hood 22 and steering wheel hood 14, and passenger side cover 15 with headrest hood 23. Both sides 15,16 are joined by seam 27, and zipper 12 that opens in direction 12. The headrest hoods 22,23 connected by an integral flat area 21 are attached to the basic tonneau cover 15,16 by two zippers 19,20 opening in opposite directions 19,20 and extending from the center-front of headrest hood 21,22,23 to the center-back of headrest hood 21,22,23, each zipper extending over and allowing separation from the tonneau cover of one-half of the entire headrest hood 21,22,23 and together making the entire headrest hood 21,22,23 completely removable from the tonneau cover.

Note that seam 27 would not be necessary if the basic tonneau cover material can be procured and is desired in the full required width, on the other hand, more seams may be required if it were desired to mix basic tonneau cover materials.

Note that zippers 12,19,20 are optional singly or in any combination thereof, but are included to increase the versatility of the tonneau cover. Zipper 12 allows the portion of the tonneau cover over the driver's side to be opened, and zipper 19 allows it to be folded back and behind the driver's seat to allow a driver to sit in or drive the vehicle without having to remove the entire tonneau cover, and if desired zipper 12 also allows the portion of the tonneau cover over the passenger side to be opened, and zipper 20 allows it to be folded back and behind the passenger seat to allow a passenger to sit in the vehicle without having to first remove the entire tonneau cover.

Note that the versatility of the design of the dual zippers 19,20 allow the actual folding of each side of the tonneau cover behind their respective seats, and as a practical matter would not probably be optional if zipper 12 is included. However, the inclusion of each zipper or combination thereof might still be up to the customer on an individual custom basis, provided that he is willing to accept any inconveniences or loss of versatility caused by his choice.

It is understood that there are other closure methods that may be suitable that may include but are not limited to zippers, velcro fastening, etc.

Connecting tabs 24,25,28,29, integral with the cover of FIG. 1 are one very important feature of the instant improvement, and make use of the design features that exist as original equipment on a vehicle as manufactured, such concept being adapted as is practicable, to any vehicle, attachable to the vehicle by any of a variety of suitable temporary means that may include but are not limited to grommets, clips, etc., and thereby helping to secure the tonneau cover to the vehicle thereby allowing the vehicle to remain as originally manufactured.

It is understood that the tonneau cover may be formed from any of a variety of suitable materials, colors, or combinations thereof, by any of a variety of methods, processes, or combinations thereof; the separate parts if any being joined together by any of a wide variety of suitable methods, processes, or combinations thereof; with many new and improved features; and adaptable to a wide variety of design features already existing on a wide variety of vehicles, which may include but are not limited to those illustrated or discussed herein, and to which the instant invention pertains and may be adapted.

Figure 2:
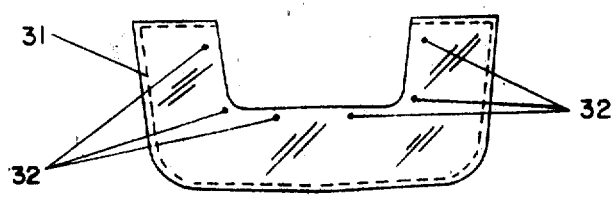
FIG. 2 is a plan view of the boot portion of the tonneau cover.

FIG. 2 is a plan view of the portion of the tonneau cover that covers the 'boot'. (The term 'boot' refers to the 'well' or area into which the convertible vehicle top folds.) Some vehicles come with a fabric boot-cover or removable boot-covers of other more rigid materials, and some come equipped with a hinged metal boot-cover that opens to receive the top, and then closes over the boot. Since most convertibles come equipped with boot-covers as original equipment, the boot cover of FIG. 2 may be optional, but it may be desired to include a matching or contrasting boot-cover that compliments the tonneau cover. Accordingly, the boot-cover of FIG. 2 will in turn cover an existing boot cover that is standard equipment on a vehicle, and is attached to the tonneau cover of FIG. 1 by snaps 26,32 that are installed on the cover only, and secured to the existing boot-cover by fabric-facing 31 which fits around the edge of the existing boot-cover when it is open, and allows the existing boot-cover to help secure the cover of FIG. 2 when the existing boot-cover is closed. Since the cover of FIG. 2 may be optional, snaps 26 might also be optional if cover of FIG. 2 was not to be included.

Note that the illustrated boot-cover of FIG. 2 need not necessarily be made to cover the entire existing boot. It might be made smaller to cover only a portion of the existing boot cover, in which case the facing 31 would not be used and tabs 28, 29 would be extended under and over the existing boot-cover and be secured by snaps similar to 26,32 installed in the ends of the tabs and on the outside of the boot-cover of FIG. 2 in place of fabric-facing 31. As many tabs 28,29 would be incorporated into the tonneau cover of FIG. 1 as would be deemed necessary to secure the boot cover of FIG. 2 adequately to the main cover FIG. 1.

Fabric-facing 31 is another very important feature in the concept of the instant improvement to help secure the tonneau cover to the vehicle while allowing the vehicle to remain as originally manufactured. The concept of fabric-facing may also be adapted to other areas of the tonneau cover on suitable vehicles that may have trim or design features as standard equipment that lend themselves to this manner of attachment.

Another variation of attachment methods that allow the vehicle to remain as originally manufactured, is the concept of clips and/or hooks which may be adapted and used in place of or in conjunction with fabric-facing on vehicles that have existing trim or design features that lend themselves to being clipped onto or hooked over by such adaptation; and may be but need not be continuous along length 31, but may be in the form of several shorter lengths spaced along length 31 as may be deemed necessary or desirable in a particular situation.

It is understood that the boot-cover of FIG. 2 may be made from any of a variety of suitable materials and colors or combinations thereof that may match or be contrasting to the basic cover, by a wide variety of methods, processes, or combinations thereof, in any of a variety of shapes and sizes to suit particular vehicles and situations, and secured by a wide variety of snaps, fasteners, or combinations thereof, installed on the cover only, that are or will be available in the future, which may include but are not limited to those herein discussed or illustrated.

It is also understood that fabric-facing, tabs, clips, hooks, or even magnets or magnetic material (since vehicles are largely made from material attractable to magnets), or any combination thereof, may be formed from any of a wide variety of suitable materials or combinations thereof which may include but are not limited to fabric or more rigid materials such as hard rubber, metal, plastic, or combinations thereof, by methods or processes or combinations thereof, and may be adapted and used in any area of the tonneau cover practicable and on any suitable vehicle that has existing trim or design features that lend themselves to this concept of attachment, and joined to the tonneau cover by any of a variety of suitable means or combinations thereof which may include but are not limited to sewing and/or gluing, etc.

Figure 3:
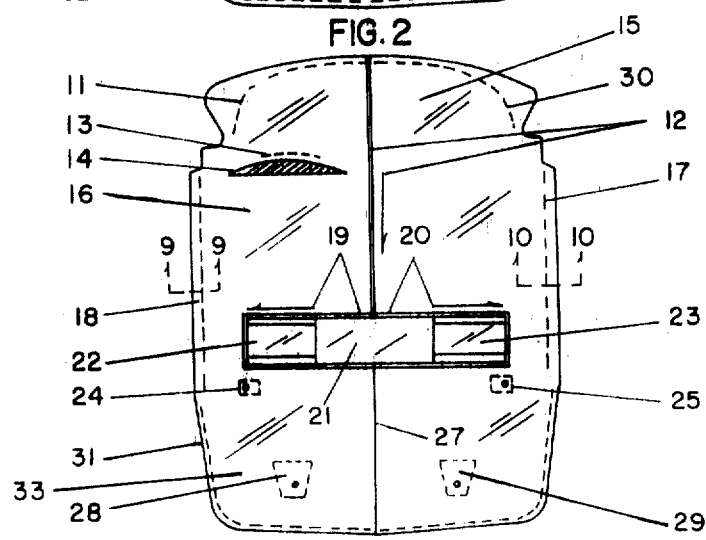
FIG. 3 is a plan view of an integral tonneau cover and boot portion.

FIG. 3 is a plan view of a tonneau cover in which the basic cover of FIG. 1 and the boot-cover of FIG. 2 are integral and not separate pieces. Therefore, tabs 24,25,28,29 are not integral but rather attached to the underside of the tonneau cover by any suitable means. Again, the boot-cover portion of the tonneau cover need not cover the existing boot entirely, and the general discussion in connection with boot-cover of FIG. 2 would pertain. Since the boot-cover is an integral part of the tonneau cover, snaps or fasteners 26,32 are not necessary in the form illustrated. However, for vehicles with fabric boot-covers or removable boot-covers of other material, it may be desired to allow a boot-cover complimenting the basic tonneau cover either in the form of separated boot-cover of FIG. 2 or integral boot-cover of FIG. 3, to take the place of the original boot-cover when the tonneau cover is used, in which case suitable snaps and/or fasteners would be installed into the cover in place of or in conjunction with fabric-facing 31 in such a way as to match the fasteners in form and position that may already exist on the vehicle, and in this case it would probably be desirable for the boot-cover portion of the tonneau cover to extend over the entire boot. The general discussion of construction materials, processes, joining methods, etc. in the tonneau cover of FIG. 1 and the boot cover of FIG. 2 generally pertain here. Note, that if desired, the boot-cover portion of the tonneau cover may be made integral by permanent attachment such as sewing, etc., of separate pieces, with the tabs being left naturally integral as in FIG. 1.

Stiffeners are another important feature in the tonneau cover of the concept of the instant improvement to help keep the tonneau cover in place while preserving the vehicle as originally manufactured, formed from any of a wide variety of suitable materials that may be selected for adequate spring, resilience, and resistance to rupturing or permanent deformation that may include but are not limited to metal, plastic, or combinations thereof, and attached to the underside of the tonneau cover at 11 on the driver's side of cover 16, and at 30 on the passenger side of cover 15 or in any other places where deemed practicable and necessary, by any suitable means that may include but is not limited to, sewing and/or gluing.

Steering-wheel bracket 13 is yet another feature of the instant improvement concept, formed from any of a wide variety of suitable materials or combinations thereof that may be selected for adequate spring, resilience, and resistance to rupturing or permanent deformation that may include but are not limited to metal, plastic, or combinations thereof, and is attached to the underside of the tonneau cover at 13, by any suitable means or combination thereof. This bracket helps to position and secure the tonneau cover over the steering wheel, and helps to keep the cover in place, but it is optional and may not be necessary in all situations.

Figure 4:
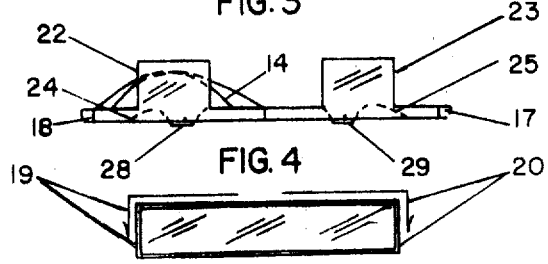
FIG. 4 is a rear elevational view of the tonneau cover in FIGS. 1-3 illustrating a steering wheel hood, head-rest hoods and tabs.

FIG. 4 is a rear elevation view of a tonneau cover such as shown in FIGS. 1,2,3, showing the steering-wheel hood 14, headrest hoods 22,23, and tabs 24, 25,28,29. Note that the headrest hoods 22,23 herein illustrated and discussed as being connected by a flat integral piece 21, may be made separatable as desired by using zippers or other methods of closure with headrest hood components 21,22,23 in any combination desired.

Figure 5:
FIG. 5 is a plan view of a separate piece that takes the place of the removable head-rest hoods when they are removed.

FIG. 5 is a plan view of a separate piece that may take the place of the removable headrest hood 21,22,23 when it is unzipped and removed and when the headrests are removed from those vehicles that permit headrest removal. Therefore, it also includes two zippers 19,20 opening in opposite directions 19,20 and extending from the center-front of the filler-piece FIG. 5 to the center-back of the filler-piece of FIG. 5, each zipper extending over one-half of the entire filler-piece of FIG. 5.

FIG. 6 is a side elevation of the basic tonneau cover of FIG. 1 showing the steering-wheel hood 14, cover stiffeners 11,30, steering-wheel bracket 13, special window-well tab 18,17, headrest hood 21,22,23, tabs 24,25,28,29, and snaps 26.

FIG. 7 is a side elevation of the separate boot-cover of FIG. 2 showing snaps 26, and fabric-facing 31 attached to the underside of the boot-cover of FIG. 2 by any of a wide variety of suitable means or combinations thereof.

FIG. 8 is a side elevation of the basic tonneau cover of FIG. 3, showing the steering-wheel hood 14, cover stiffeners 11,30, steering-wheel bracket 13, special window-well tab 18,17, headrest hood 21,22,23, tabs 24,25,28,29, and fabric facing 31 attached to the underside of the boot-cover portion of tonneau cover of FIG. 3 by any of a variety of suitable means or combinations thereof.

Section 9,10 are full size detail elevation views of the special window-well tabs 17,18 which are designed to be inserted into the window-wells on the driver's side and passenger side of a vehicle when the window is open and down, and is the most important new feature in the improvement concept of the instant invention. They extend the full length of the window-wells, and are formed by folding under the material allowance in the fabric 36 and attaching it to the underside of the basic tonneau cover 15,16 by any of a wide variety of suitable means or combinations thereof that may include but are not limited to sewing 35 and/or gluing; thence around and encasing a filler 34 that may be formed from any of a wide variety of materials or combinations thereof, and by any of a variety of methods, processes, or combinations, thereof, selected to produce adequate spring, resilience, and resistance to rupturing or permanent deformation, which may include but are not limited to hard rubber, metal, plastic, or combinations thereof, and which may be attached to or made a part of the tonneau cover by any of a wide variety of suitable means which may include but are not limited to sewing and/or gluing; and thence secured further to the tonneau cover by any of a variety of suitable means or combinations thereof that may include but are not limited to sewing 37 and/or gluing. It should be noted that tabs 17,18 need not necessarily extend the full length of the window-wells, but may consist of one or more shorter tabs spaced along the length 17,18 as may be deemed desirable in a particular situation.

FIG. 11 is a detail elevation view of a variation of the filler 34 that may be used in place of or in combination with that shown in Section 9,10, for those vehicles that may have trim along the window-wells or other existing design features that lend themselves to being clipped to or hooked over by an adaptation such as FIG. 11 for Section 9, and when reversed and made contra, adapts to Section 10.

FIG. 12 is a full size detail elevation view showing an example of a tonneau cover stiffeners 11,30, and steering wheel bracket of 13, and consisting of a tubular plastic rod of appropriate length at 11,30,13 incased in any of a variety of materials or combinations thereof which may include but are not limited to that material that forms the basic tonneau cover 38, and joined to itself by any of a variety of suitable means or combinations thereof which may include but are not limited to sewing 39 and/or gluing; and then secured to the tonneau cover in suitable lengths at 11,30,13, by any of a variety of suitable means which may include but are not limited to sewing and/or gluing. Note that this construction allows the plastic rod to be free to slip in and out of its encasement.

It is understood that the special window-well tabs 17,18, clips or hooks FIG. 11, cover stiffeners or steering-wheel bracket FIG. 12, which comprise several of the important new features and improvements in the instant invention, may be formed from any of a variety of materials or combinations thereof, some of which that may be selected for adequate spring, resilience, and resistance to rupturing or permanent deformation including but not limited to hard rubber, metal, plastic, or combinations thereof, by any of a variety of methods, processes, or combinations thereof, attached by any of a variety of suitable means that may include but are not limited to sewing and/or gluing, in any of a variety of shapes and sizes or combinations thereof; to adapt the instant concept to the many vehicle marques that now exist or that may exist in the future, and may include but are not limited to those herein illustrated and described.

Now it is seen that there is herein provided a snapless or snap-free tonneau cover that accomplishes all the objectives of the instant invention and others, including advantages of commercial import.

Since many embodiments may be made of the instant inventive concept, and since many modifications may be made in the embodiments hereinbefore illustrated and described, it is understood that the foregoing is to be interpreted merely as illustrated and that the full possibilities may include the examples illustrative and/or discussed herein but are not limited to them.

I claim:

1. In combination with a vehicle having a passenger compartment defined at its front by a transversely extending section commonly known as the dashboard, at its sides by a pair of vehicle side walls, at its rear by a transversely extending panel, and having an open upper side and a tonneau cover, each of said vehicle side walls includes a door having a window well, and said tonneau cover comprises:

a main body portion of a substantially rigid material;

attachment means extending downward from said main body portion, and a plurality of tabular members extending into said window wells of said doors of said vehicle, said attachment means extends from said main body portion for a sufficient extent to hold said cover to said vehicle, said attachment means are substantially rigid, whereby said vehicle can remain as originally manufactured, while said cover is able to extend over, protect, and decorate said passenger compartment of said vehicle.

2. The combination of claim 1, further including male-female tabular attachment means extending from a rear area of said main body portion, said male-female tabular attachment means secure said cover to said vehicle by mating with a complimentary member on a windshield header, said header being a part of a convertible folding top existing in said vehicle, said cover is attached to said vehicle when said top is folded down into a convertible top housing well opening that extends transversely to said vehicle and substantially to the rear of said passenger compartment.

3. The combination of claim 1, including a rear portion of said tonneau cover designed to extend over, protect, and decorate a hinged rigid cover which covers a convertible top housing well opening of said vehicle, and further including a fabric facing extending around an underside edge of said rear portion, said fabric facing being inserted under and around an edge of said rigid cover which, when said rigid cover seats within said vehicle, there is a smooth and snug appearance.

4. The combination of claim 1, further including cover-stiffeners that extend along the edge of said tonneau cover in the frontal area near the windshield of said vehicle to secure said tonneau cover in place by a spring tension action.

5. The combination of claim 1, further including cover-stiffeners that extend downward from said tonneau cover in the frontal area near the windshield of said vehicle and are of a predetermined size that extends into openings in said vehicle adjacent to said windshield which help secure said tonneau cover to said vehicle.

6. The combination of claim 1, further including head rest hoods designed to extend over, cover, protect, and decorate a pair of vehicle head rests; said head rest hoods being removable from said tonneau cover.

7. The combination of claim 1, further including a steering wheel hood, said hood having a tab extending downward from the underside of said hood, said tab positions and secures said steering wheel hood of said tonneau cover to extend over a vehicle steering wheel.

* * * * *